(12) United States Patent
Zhang et al.

(10) Patent No.: US 12,314,610 B2
(45) Date of Patent: May 27, 2025

(54) SEQUENTIAL READ PREFETCHING METHOD AND APPARATUS, DEVICE, AND MEDIUM

(71) Applicant: SUZHOU METABRAIN INTELLIGENT TECHNOLOGY CO., LTD., Jiangsu (CN)

(72) Inventors: Yingjie Zhang, Jiangsu (CN); Xiangrui Meng, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/716,278

(22) PCT Filed: Nov. 29, 2022

(86) PCT No.: PCT/CN2022/135170
§ 371 (c)(1),
(2) Date: Jun. 5, 2024

(87) PCT Pub. No.: WO2023/165188
PCT Pub. Date: Sep. 7, 2023

(65) Prior Publication Data
US 2024/0427525 A1 Dec. 26, 2024

(30) Foreign Application Priority Data
Mar. 1, 2022 (CN) .......... 202210192660.9

(51) Int. Cl.
*G06F 3/06* (2006.01)
(52) U.S. Cl.
CPC .......... *G06F 3/0659* (2013.01); *G06F 3/0604* (2013.01); *G06F 3/0676* (2013.01)

(58) Field of Classification Search
CPC .... G06F 3/0659; G06F 3/0604; G06F 3/0676; G06F 3/06; G06F 3/061
(Continued)

(56) References Cited

U.S. PATENT DOCUMENTS

| 10,191,959 B1 | 1/2019 | Nguyen |
| 2009/0055399 A1 | 2/2009 | Lu et al. |

(Continued)

FOREIGN PATENT DOCUMENTS

| CN | 103135967 A | 6/2013 |
| CN | 103250141 A | 8/2013 |

(Continued)

OTHER PUBLICATIONS

International search report for PCT/CN2022/135170 mailed on Feb. 8, 2023.

*Primary Examiner* — Hua J Song
(74) *Attorney, Agent, or Firm* — Dennemeyer & Associates LLC (57) ABSTRACT

The present application provides a sequential read prefetching method and apparatus based on an Inspur Cluster File System (ICFS) distributed block storage system, a device, and a non-volatile readable storage medium. The method includes: in response to an OSD receiving a read request issued by a client, determining whether the read request is a sequential read request; in response to the read request being the sequential read request, creating a prefetching sliding window according to a data object to be read in the read request; in response to completion of the creation of the prefetching sliding window, calculating, according to the data object to be read in the read request, anew volume object needing to be prefetched; and adding the calculated
(Continued)

new volume object needing to be prefetched into a queue of objects to be prefetched of the prefetching sliding window and executing prefetching.

20 Claims, 2 Drawing Sheets

(58) Field of Classification Search
USPC .......................................................... 711/154
See application file for complete search history.

(56) References Cited

U.S. PATENT DOCUMENTS

| | | |
|---|---|---|
| 2013/0018851 A1 | 1/2013 | Jayaraman et al. |
| 2013/0128893 A1 | 5/2013 | Jorgensen |
| 2015/0242437 A1 | 8/2015 | Lee et al. |
| 2017/0031823 A1* | 2/2017 | Ross ................... G06F 12/0862 |
| 2020/0327063 A1* | 10/2020 | Kang .................. G06F 12/0871 |

FOREIGN PATENT DOCUMENTS

| | | |
|---|---|---|
| CN | 103577158 A | 2/2014 |
| CN | 104715048 A | 6/2015 |
| CN | 106557431 A | 4/2017 |
| CN | 109542361 A | 3/2019 |
| CN | 110737388 A | 1/2020 |
| CN | 110780819 A | 2/2020 |
| CN | 111782612 A | 10/2020 |
| CN | 112328185 A | 2/2021 |
| CN | 113419824 A | 9/2021 |
| CN | 114077588 A | 2/2022 |
| CN | 114327299 A | 4/2022 |

* cited by examiner

SEQUENTIAL READ PREFETCHING METHOD AND APPARATUS, DEVICE, AND MEDIUM

CROSS-REFERENCE TO RELATED APPLICATION

This application claims priority to Chinese Patent Application No. 202210192660.9, entitled "SEQUENTIAL READ PREFETCHING METHOD AND APPARATUS, DEVICE, AND MEDIUM", filed with the China National Intellectual Property Administration on Tuesday, Mar. 1, 2022, which is incorporated by reference in its entirety.

TECHNICAL FIELD

The present application relates to the field of computers, and more particularly, to a sequential read prefetching method and apparatus based on an Inspur Cluster File System (ICFS) distributed block storage system, a device, and a non-volatile readable storage medium.

BACKGROUND

In an Inspur Cluster File System (ICFS) distributed object storage system in a block storage scenario, a continuous logical space on a virtual logical volume used by users is actually composed of a plurality of 4M (megabytes)-sized objects stored at a bottom layer. These objects are uniformly distributed on an Object-based Storage Device (OSD) of the bottom layer through a Crush data distribution algorithm (an extensible pseudo-random data distribution algorithm) to carry actual read and write services. This distribution policy can improve the concurrency of magnetic disks in face of random read and write services and improve the reliability and extendibility of the storage system, and can also bring certain difficulties to the implementation of a prefetching mechanisms in a sequential read scenario. There are specific difficulties as follows:

1. Difficulty in scenario recognition. For a traditional centralized storage system, determining a sequential read prefetching service scenario can be achieved by only determining whether read requests issued by a user are continuous within a certain period of time. For a distributed block storage system, a user uses a plurality of virtual volumes abstracted by the storage system. These virtual volumes are split into a plurality of objects and are then uniformly distributed on different placement groups (PGs) through a data distribution algorithm. The PGs are distributed on various OSDs of different nodes. In response to the fact that the plurality of virtual volumes of the user simultaneously carry services, a single OSD may carry the read and write of data objects of the plurality of volumes, which makes it difficult for distributed storage system to locally determine a sequential read scenario.

2. Difficulty in prefetching implementation. Software of the traditional centralized storage system is implemented only uses a single process, and a general process can coordinate the management of read, write, and prefetching of magnetic disks. In the ICFS distributed block storage system, to avoid a failure of a single point from affecting an entire cluster, each OSD is responsible for managing the read and write of its own data. The sequential read of a single virtual volume involves the read and write of the data on the plurality of OSDs, and communications between the OSDs require cross-progress or cross-node network communications. The complexity and effectiveness will be unsatisfactory if the traditional prefetching mechanism is used for implementation.

SUMMARY

One or more aspects of the embodiments of the present application provide a sequential read prefetching method based on an ICFS distributed block storage system, including the following steps:
  in response to an Object-based Storage Device (OSD) receiving a read request issued by a client, whether the read request issued by the client is a sequential read request is determined;
  in response to the read request issued by the client being the sequential read request, a prefetching sliding window is created according to a data object to be read in the read request;
  in response to completion of the creation of the prefetching sliding window, according to the data object to be read in the read request, at least one new volume object needing to be prefetched is calculated; and
  the calculated new volume object needing to be prefetched is added into a queue of objects to be prefetched of the prefetching sliding window and prefetching is executed.

According to one or more embodiments of the present application, the method further includes:
  in response to the execution of the prefetching, at least one prefetching data object is saved into a cache of an internal memory.

According to one or more embodiments of the present application, the step of in response to the execution of the prefetching, at least one prefetching data object is saved into a cache of an internal memory includes:
  in response to the execution of the prefetching, the prefetching data object is acquired from a magnetic disk; and
  the prefetching data object is saved into the cache of the internal memory.

According to one or more embodiments of the present application, after the in response to the execution of the prefetching, at least one prefetching data object is saved into a cache of an internal memory, the method further includes:
  in response to a subsequent sequential read service reading the new volume object needing to be prefetched, the prefetching data object is read from the cache of the internal memory.

According to one or more embodiments of the present application, after the in response to the execution of the prefetching, at least one prefetching data object is saved into a cache of an internal memory, the method further includes:
  in response to the new volume object needing to be prefetched receiving a write request, the prefetching data object is updated to be at least one newly written data.

According to one or more embodiments of the present application, the in response to completion of the creation of the prefetching sliding window, according to the data object to be read in the read request, at least one new volume object needing to be prefetched is calculated includes:
  a range of prefetching data objects is determined according to the data object to be read in the read request;
  object names of all objects within the range of prefetching data objects are constructed; and
  in response to placement groups (PGs) calculated from the constructed object names through a Crush algorithm being located in a PG distribution diagram of the OSD, that data objects corresponding to the object names are determined to volume objects needing to be prefetched.

According to one or more embodiments of the present application, before the step of a range of prefetching data objects is determined according to the data object to be read in the read request, the method further includes:
  object that are closest to read data is acquired; and
  the closest object is set to be a prefetching data object.

According to one or more embodiments of the present application, after the step of the calculated new volume object needing to be prefetched is add into a queue of objects to be prefetched of the prefetching sliding window and prefetching is executed, the method further includes:
  a prefetching position that has been read of the prefetching sliding window is updated.

According to one or more embodiments of the present application, the calculated new volume object needing to be prefetched is add into a queue of objects to be prefetched of the prefetching sliding window and prefetching is executed includes:
  a separate thread is created to execute the prefetching; and
  data objects needing to be prefetched are acquired from the queue of objects to be prefetched of the prefetching sliding window, prefetching is executed, and all the objects needing to be prefetched are cyclically processed.

According to one or more embodiments of the present application, after the step of in response to the read request issued by the client being the sequential read request, a prefetching sliding window is created according to a data object to be read in the read request, the method further includes:
  in response to receiving a new sequential read object, a new prefetching sliding window is created or a position that has been read of the prefetching sliding window is updated; and
  in response to detecting that a time period during which the position that has been read of the prefetching sliding window has not been updated reaches a preset time period, the prefetching sliding window is deleted.

According to one or more embodiments of the present application, after the step of the calculated new volume object needing to be prefetched is add into a queue of objects to be prefetched of the prefetching sliding window and prefetching is executed, the method further includes:
  in response to the execution of prefetching, selection of prefetching data object, and selection of no prefetching data object timing out, corresponding statistical items are update.

According to one or more embodiments of the present application, after the step of in response to the execution of prefetching, selection of prefetching data object, and selection of no prefetching data object timing out, corresponding statistical items are update, the method further includes:
  updated statistical items are sent to an external interface.

According to one or more embodiments of the present application, after the step of in response to a OSD receiving a read request issued by a client, whether the read request issued by the client is a sequential read request is determined, the method further includes:
  in response to the OSD receiving the read request issued by the client, a data object name of the data object to be read is analyzed; and
  a volume identity document is determined according to the data object name.

According to one or more embodiments of the present application, after the step of a volume identity document is determined according to the data object name, the method further includes:
  a prefetching processor is determined according to the volume identity document.

According to one or more embodiments of the present application, the prefetching processor includes a data structure that records states of all sequential read services on a specific volume.

According to one or more embodiments of the present application, the step of whether the read request issued by the client is a sequential read request is determined includes:
  according to the read request issued by the client, whether the client is located in a sequential read scenario is determined; and
  according to a determining result, whether the read request is the sequential read request is determined.

According to one or more embodiments of the present application, the step of in response to the read request issued by the client being the sequential read request, a prefetching sliding window is created according to a data object to be read in the read request includes:
  a plurality of prefetching sliding windows are created according to the data object to be read in the read request; and
  a position that has been read and a prefetching position that has been read of a corresponding sequential read service in each sliding window, and a queue composed of objects that need to be subsequently prefetched but have not been prefetched are recorded.

Another one or more aspects of the embodiments of the present application provide a sequential read prefetching apparatus based on an ICFS distributed block storage system. The apparatus includes:
  a determining module, wherein the determining module is configured for: in response to an OSD receiving a read request issued by a client, determining whether the read request issued by the client is a sequential read request;
  a creation module, wherein the creation module is configured for: in response to the read request issued by the client being the sequential read request, creating a prefetching sliding window according to a data object to be read in the read request;
  a calculation module, wherein the calculation module is configured for: in response to completion of the creation of the prefetching sliding window, calculating, according to the data object to be read in the read request, at least one new volume object needing to be prefetched; and
  an execution module, wherein the execution module is configured for adding the calculated new volume object needing to be prefetched into a queue of objects to be prefetched of the prefetching sliding window and executing prefetching.

Still another one or more aspects of the embodiments of the present application further provide a computer device. The computer device includes:
  at least one processor; and
  a memory, wherein the memory stores computer-readable instructions that can be executed on the processor; and the instructions, when executed by the processor, implement the steps of any one of the methods described above.

Yet another or more aspects of the embodiments of the present application further provide a non-volatile readable storage medium. The non-volatile readable storage medium stores computer-readable instructions. The computer-readable instructions, when executed by a processor, implement the steps of any one of the methods described above.

BRIEF DESCRIPTION OF THE DRAWINGS

To describe the technical solutions in the embodiments of the present application or in the related art more clearly, the following briefly introduces the accompanying drawings for describing the embodiments or the related art. Apparently, the accompanying drawings in the following description show merely some embodiments of the present application, and a person of ordinary skill in the art may still derive other embodiments from the accompanying drawings without creative efforts.

DETAILED DESCRIPTION OF THE EMBODIMENTS

In order to make the objectives, technical solutions, and advantages of the present application clearer, the following is a further detailed explanation of the embodiments of the present application in conjunction with the accompanying drawings.

Figure 1:
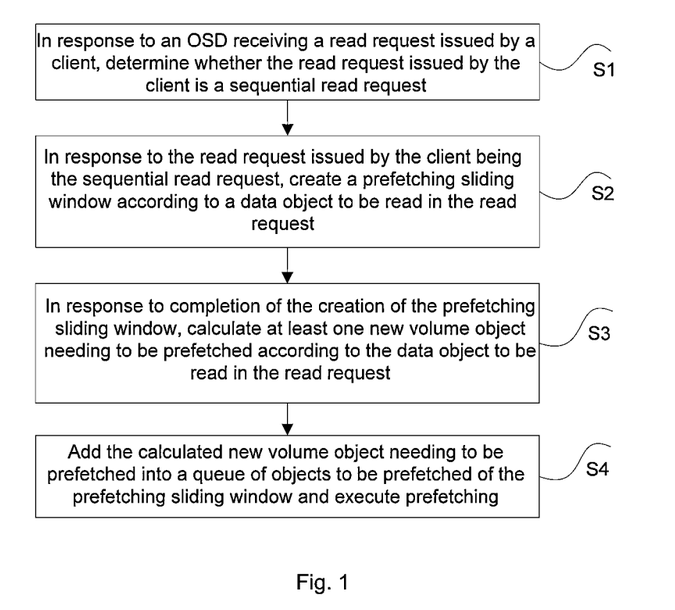
FIG. 1 is a schematic flowchart of a sequential read prefetching method based on an ICFS distributed block storage system according to one or more embodiments of the present application.

Based on the above objectives, one or more aspects of the embodiments of the present application provide one or more embodiments of a sequential read prefetching method based on an ICFS distributed block storage system. FIG. 1 shows a schematic flowchart of the method.

As shown in FIG. 1, the method may include the following steps:

S1. In response to an OSD receiving a read request issued by a client, whether the read request issued by the client is a sequential read request is determined.

Firstly, whether the client is located in a sequential read scenario is determined according to the read request issued by the client. In response to a single OSD receiving the read request, a data object name is analyzed to confirm which volume that the data object belongs. In response to the data object being identified for multiple times that it has a sequential read request in the object, the data object is sent, according to an identity document of a volume, to a prefetching processor exclusive to the volume for processing.

S2. In response to the read request issued by the client being the sequential read request, a prefetching sliding window is created according to a data object to be read in the read request.

The prefetching processor of the volume is a data structure that records states of all sequential read services on a specific volume, and is implemented through a plurality of sliding windows. A position that has been read and a prefetching position that has been read of a corresponding sequential read service are recorded in each sliding window, and a queue composed of objects that need to be subsequently prefetched but have not been prefetched. In response to receiving a new sequential read object, a new prefetching sliding window is created or a position that has been read of the old prefetching sliding window is updated according to a situation. In response to the position that has been read of the prefetching sliding window having not been updated for long time, it is considered that the prefetching service has completed, and the prefetching sliding window is deleted.

S3. In response to completion of the creation of the prefetching sliding window, at least one new volume object needing to be prefetched is calculated according to the data object to be read in the read request.

A range of prefetching data objects is determined according to the data object to be read in the read request; an object name corresponding to the position that has been read is analyzed, and object names of all objects within the range of prefetching data objects are constructed; if placement groups (PGs) calculated from the constructed object names through a Crush algorithm are located in a PG distribution diagram of the OSD, it is determined that data objects corresponding to the object names are volume objects needing to be prefetched; and volume objects needing to be prefetched are added into a queue of objects to be prefetched of the sliding window.

S4. The calculated new volume object needing to be prefetched is added into a queue of objects to be prefetched of the prefetching sliding window, and prefetching is executed.

In response to execution of a prefetching operation, a separate thread is created to execute the prefetching; and data objects needing to be prefetched are acquired from the queues of objects to be prefetched of all the existing prefetching sliding windows, prefetching is executed, and all the objects needing to be prefetched are cyclically processed. In response to the acquisition of the prefetched data objects, object that is closest to data that has been previously read is preferentially acquired. After the prefetching is completed, the prefetching position that has been read in the sliding window is updated, and the acquired objects are deleted from the queue of objects to be prefetched of the corresponding sliding window.

Through the technical solutions of the present application, the performance of the sequential read scenario of the ICFS distributed block storage system may be improved, and the magnetic disk utilization rate is increased.

In one or more embodiments of the present application, the method further includes:

In response to the execution of the prefetching, prefetching data object is saved into a cache of an internal memory. In response to the execution of the prefetching, an entire data object is read from a magnetic disk, and the prefetching data object is saved into the cache of the internal memory. In response to the object being read by a subsequent sequential read service, the object can be directly read from the cache of the internal memory. During this period, if the object accepts a write request, data of the internal memory needs to be synchronously updated to be newly written data.

In one or more embodiments of the present application, in response to completion of the creation of the prefetching sliding window, at least one new volume object needing to be prefetched is calculated according to the data object to be read in the read request, which includes:

A range of prefetching data objects is determined according to the data object to be read in the read request;

object names of all objects within the range of prefetching data objects are constructed; and in response to PGs calculated from the constructed object names through a Crush algorithm being located in a PG distribution diagram of the OSD, it is determined that data objects corresponding to the object names are volume objects needing to be prefetched.

In one or more embodiments of the present application, the new volume object needing to be prefetched is added into a queue of objects to be prefetched of the prefetching sliding window, and prefetching is executed, which includes:

A separate thread is created to execute the prefetching; and data objects needing to be prefetched are acquired from the queue of objects to be prefetched of the prefetching sliding window, prefetching is executed, and all the objects needing to be prefetched are cyclically processed. In response to execution of a prefetching operation, the separate thread can be created to execute the prefetching; and the data objects needing to be prefetched are acquired from the queues of objects to be prefetched of all the existing prefetching sliding windows, prefetching is executed, and all the objects needing to be prefetched are cyclically processed. During the acquisition of the prefetched data objects, object that is closest to data that has been previously read is preferentially acquired. After the prefetching is completed, the prefetching position that has been read in the sliding window is updated, and the acquired objects are deleted from the queue of objects to be prefetched of the corresponding sliding window.

In one or more embodiments of the present application, in response to the execution of prefetching, selection of prefetching data object, and selection of no prefetching data object timing out, corresponding statistical items are updated and are provided for an external interface for reference during running of services.

The technical solutions of the present application are suitable for the ICFS distributed storage system in a block scenario. By enabling each OSD in an ICFS cluster to autonomously identify, prefetch, and count sequential read services in its own process, this method achieves an overall prefetching function effect, improves the performance of the sequential read scenario of the ICFS distributed block storage system, and increases the magnetic disk utilization rate.

It should be noted that a person of ordinary skill in the art may understand that all or some of the procedures of the method in the foregoing embodiments may be implemented by computer-readable instructions that instruct relevant hardware. The above program may be stored in a non-volatile readable storage medium. When the program is run, the procedures of the various foregoing method embodiments may be implemented. The non-volatile readable storage media can be a magnetic disk, an optical disk, a Read-Only Memory (ROM), or a Random Access Memory (RAM), and the like. The embodiment of the computer-readable instructions described above may achieve the same or similar effects as the aforementioned corresponding method embodiments.

In addition, the method disclosed by the embodiments of the present application can also be implemented as computer-readable instructions executed by a central processing unit (CPU), and the computer-readable instructions can be stored in a non-volatile readable storage medium. When the computer-readable instructions are executed by the CPU, the above-mentioned functions defined in the method disclosed in the embodiments of the present application.

Based on the above objectives, a second aspect of the embodiments of the present application provides a sequential read prefetching apparatus based on an ICFS distributed block storage system.

Figure 2:
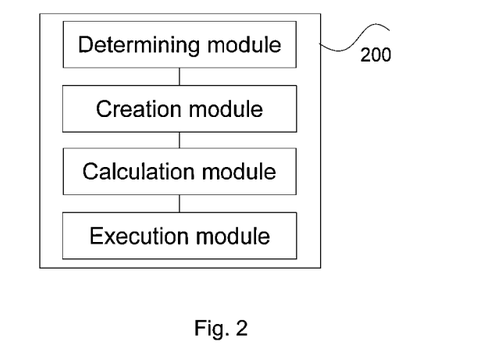
FIG. 2 is a schematic diagram of a sequential read prefetching apparatus based on an ICFS distributed block storage system according to one or more embodiments of the present application.

As shown in FIG. 2, the apparatus 200 includes:

a determining module, wherein the determining module is configured for: in response to an OSD receiving a read request issued by a client, determining whether the read request issued by the client is a sequential read request;

a creation module, wherein the creation module is configured for: in response to the read request issued by the client being the sequential read request, creating a prefetching sliding window according to a data object to be read in the read request;

a calculation module, wherein the calculation module is configured for: in response to completion of the creation of the prefetching sliding window, calculating, according to the data object to be read in the read request, at least one new volume object needing to be prefetched; and an execution module, wherein the execution module is configured for adding the new volume object needing to be prefetched into a queue of objects to be prefetched of the prefetching sliding window and executing prefetching.

In one or more embodiments of the present application, the apparatus further includes a saving module. The saving module is configured to:

in response to the execution of the prefetching, save at least one prefetching data object into a cache of an internal memory.

In one or more embodiments of the present application, the calculation method is further configured for:

determining a range of prefetching data objects according to the data object to be read in the read request;

constructing object names of all objects within the range of prefetching data objects; and in response to PGs calculated from the constructed object names through a Crush algorithm being located in a PG distribution diagram of the OSD, determining that data objects corresponding to the object names are volume objects needing to be prefetched.

In one or more embodiments of the present application, the execution method is further configured for:

creating a separate thread to execute the prefetching; and acquiring data objects needing to be prefetched from the queue of objects to be prefetched of the prefetching sliding window, executing prefetching, and cyclically processing all the objects needing to be prefetched.

Figure 3:
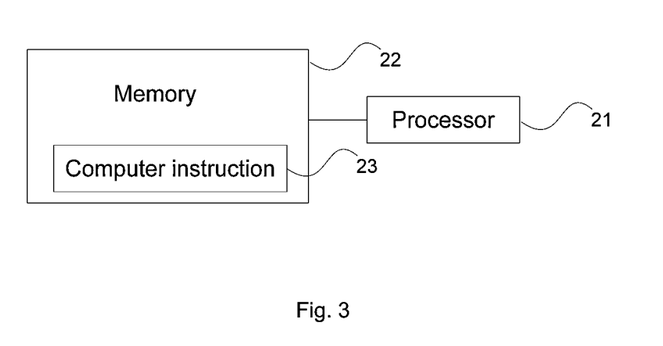
FIG. 3 is a schematic diagram of a computer device according to one or more embodiments of the present application.

Based on the above objectives, a third aspect of the embodiments of the present application provides a computer device. FIG. 3 is a schematic diagram of an embodiment of a computer device according to the present application. As shown in FIG. 3, this embodiment of the present application includes the following apparatuses: at least one processor 21; and a memory 22, wherein the memory 22 stores computer-readable instructions 23 that can be executed on the processor; and the instructions, when executed by the processor, implement the method disclosed by any embodiment described above.

Figure 4:
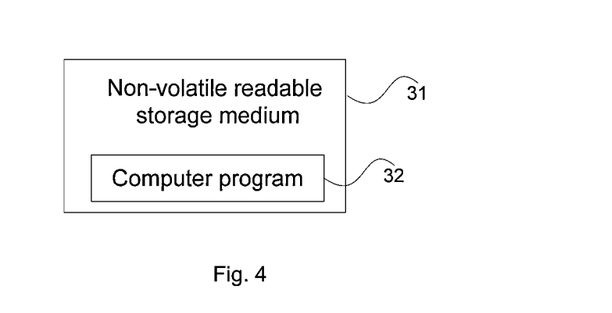
FIG. 4 is a schematic diagram of a non-volatile readable storage medium according to one or more embodiments of the present application.

Based on the above objectives, a fourth aspect of the embodiments of the present application provides a non-volatile readable storage medium. FIG. 4 shows a schematic diagram of an embodiment of a non-volatile readable storage medium according to the present application. As shown in FIG. 4, the non-volatile readable storage medium 31 stores computer-readable instructions 32 which, when executed by a processor, implement the method disclosed by any embodiment described above.

In addition, the method disclosed by the embodiments of the present application can also be implemented as computer-readable instructions executed by a processor, and the computer-readable instructions can be stored in a non-volatile readable storage medium. When the computer-readable instructions are executed by the processor, the above-mentioned functions defined in the method disclosed in the embodiments of the present application.

In addition, the above method steps and system units can also be implemented using a controller and a non-volatile readable storage medium configured for storing computer-readable instructions that enable the controller to perform the above steps or unit functions.

Those skilled in the art will also understand that various exemplary logical blocks, modules, circuits, and algorithm steps described in conjunction with the disclosure here can be implemented as electronic hardware, computer software, or a combination of electronic hardware and computer software. In order to clearly explain the interchangeability between hardware and software, a general description has been made to the interchangeability in terms of the functions of the various schematic assemblies, blocks, modules, circuits, and steps. Whether this function is implemented as software or hardware depends on a specific application and a design constraints imposed on the entire system. Those skilled in the art may implement the functions for each specific application in various ways, but such implementation decisions should not be interpreted as causing departure from the scope disclosed in the embodiments of the present application.

In one or more exemplary designs, the functions can be implemented in hardware, software, firmware, or any combination thereof. If implemented in software, the functions can be stored as one or more instructions or codes on a non-volatile readable storage medium or transmitted through a non-volatile readable storage medium. The non-volatile readable storage medium includes a computer storage medium and a communication medium. The communication medium includes any medium that facilitates transmission of computer-readable instructions from one position to another position. The storage medium can be any available medium that can be accessed by a general-purpose or dedicated computer. As an example rather than a limitation, the non-volatile readable storage medium may include a RAM, a ROM, an Electrically Erasable Programmable Read Only Memory (EEPROM), a Compact Disc Read-Only Memory (CD-ROM) or other optical disk storage devices, a magnetic disk storage device or any other magnetic storage devices, or any other media that can be configured for carrying or storing desired program codes in the form of instructions or data structures and can be accessed by a general-purpose or dedicated computer or a general-purpose or dedicated processor. In addition, any connection can be appropriately referred to as a non-volatile readable storage medium. For example, if coaxial cables, fiber cables, twisted-pair cables, Digital Subscriber Lines (DSLs), or wireless technologies such as infrared, radio, and microwave are used to send software from websites, servers, or other remote sources, the coaxial cables, the fiber cables, the twisted-pair cables, the DSLs, or the wireless technologies such as infrared, radio, and microwave described above are all included in the definition of the medium. As used here, the magnetic disk and the optical disk include a Compact Disk (CD), a laser disk, an optical disk, a Digital Video Disc (DVD), a floppy disk, and a blue-ray disk. The magnetic disks typically magnetically reproduce data, and the optical disk uses laser to reproduce data. The combination of the above contents shall also fall within the scope of non-volatile readable storage medium.

The above describes exemplary embodiments disclosed in the present application, but it should be noted that various changes and modifications can be made without departing from the scope limited by the claims and disclosed in the embodiments of the present application. The functions, steps, and/or actions of the method claims of the disclosed embodiments described here do not need to be executed in any specific order. In addition, although the element disclosed in the embodiments of the present application may be described or claimed in an individual form, unless explicitly limited to a singular form. It can also be understood that there are a plurality of elements.

It should be understood that as used herein, unless the context clearly supports exceptions, the singular form "one" is intended to also include a plural form. It should also be understood that the term "and/or" used herein includes any and all combinations of one or more related listed items.

The sequential numbers of the foregoing embodiments of the present application are merely for description purpose but do not imply the preference of the embodiments.

A person of ordinary skill in the art may understand that all or some of the steps of the foregoing embodiments may be implemented by hardware, or may be implemented by a program instructing relevant hardware. The program may be stored in a non-volatile readable storage medium. The storage medium mentioned above may be a ROM, a magnetic disk, an optical disc, or the like.

A person of ordinary skill in the art should understand that the discussion of any of the above embodiments is only illustrative and not intended to imply that the scope disclosed by the embodiments of the present application is limited to these examples. Under the ideas of the embodiments of the present application, the technical features of the above embodiments or different embodiments can also be combined, and there are many other changes in different aspects of the above embodiments of the present application, which are not provided in the details for simplicity.

Therefore, any omission, modification, equivalent replacement, and improvement made within the spirit and principle of the embodiments of the present application shall fall within the protection scope of the present application.

The invention claimed is:

1. A sequential read prefetching method, comprising the following steps:
   in response to an Object-based Storage Device (OSD) receiving a read request issued by a client, determining whether the read request issued by the client is a sequential read request;
   in response to the read request issued by the client being the sequential read request, creating a prefetching sliding window according to a data object to be read in the read request, wherein each sliding window records a position that has been read and a prefetching position that has been read of a corresponding sequential read service, and a queue composed of objects that need to be subsequently prefetched but have not been prefetched;
   in response to receiving a new sequential read object, creating a new prefetching sliding window or updating a position that has been read of the prefetching sliding window;

in response to detecting that a time period during which the position that has been read of the prefetching sliding window has not been updated reaches a preset time period, deleting the prefetching sliding window;

in response to completion of the creation of the prefetching sliding window, calculating, according to the data object to be read in the read request, at least one new volume object needing to be prefetched; and adding the new volume object needing to be prefetched into a queue of objects to be prefetched of the prefetching sliding window and executing prefetching.

2. The method according to claim 1, further comprising:
in response to the execution of the prefetching, saving at least one prefetching data object into a cache of an internal memory.

3. The method according to claim 2, wherein the step of in response to the execution of the prefetching, saving at least one prefetching data object into a cache of an internal memory comprises:

in response to the execution of the prefetching, acquiring the prefetching data object from a magnetic disk; and saving the prefetching data object into the cache of the internal memory.

4. The method according to claim 2, wherein after the step of in response to the execution of the prefetching, saving at least one prefetching data object into a cache of an internal memory, the method further comprises:

in response to a subsequent sequential read service reading the new volume object needing to be prefetched, reading the prefetching data object from the cache of the internal memory.

5. The method according to claim 2, wherein after the step of in response to the execution of the prefetching, saving at least one prefetching data object into a cache of an internal memory, the method further comprises:

in response to the new volume object needing to be prefetched receiving a write request, updating the prefetching data object to be at least one newly written data.

6. The method according to claim 1, wherein the in response to completion of the creation of the prefetching sliding window, calculating, according to the data object to be read in the read request, at least one new volume object needing to be prefetched comprises:

determining a range of prefetching data objects according to the data object to be read in the read request;

constructing object names of all objects within the range of prefetching data objects; and in response to placement groups (PGs) calculated from the constructed object names through a Crush algorithm being located in a PG distribution diagram of the OSD, determining that data objects corresponding to the object names are volume objects needing to be prefetched.

7. The method according to claim 6, wherein before the step of determining a range of prefetching data objects according to the data object to be read in the read request, the method further comprises:

acquiring object that are closest to read data; and
setting the closest object to be a prefetching data object.

8. The method according to claim 1, wherein after the step of adding the calculated new volume object needing to be prefetched into a queue of objects to be prefetched of the prefetching sliding window and executing prefetching, the method further comprises:

updating a prefetching position that has been read of the prefetching sliding window.

9. The method according to claim 1, wherein the adding the calculated new volume object needing to be prefetched into a queue of objects to be prefetched of the prefetching sliding window and executing prefetching comprises:

creating a separate thread to execute the prefetching; and
acquiring data objects needing to be prefetched from the queue of objects to be prefetched of the prefetching sliding window, executing prefetching, and cyclically processing all the objects needing to be prefetched.

10. The method according to claim 1, wherein after the step of adding the calculated new volume object needing to be prefetched into a queue of objects to be prefetched of the prefetching sliding window and executing prefetching, the method further comprises:

in response to the execution of prefetching, selection of prefetching data object, and selection of no prefetching data object timing out, updating corresponding statistical items.

11. The method according to claim 10, wherein after the step of in response to the execution of prefetching, selection of prefetching data object, and selection of no prefetching data object timing out, updating corresponding statistical items, the method further comprises:

sending updated statistical items to an external interface.

12. The method according to claim 1, wherein after the step of in response to a OSD receiving a read request issued by a client, determining whether the read request issued by the client is a sequential read request, the method further comprises:

in response to the OSD receiving the read request issued by the client, analyzing a data object name of the data object to be read; and determining a volume identity document according to the data object name.

13. The method according to claim 12, wherein after the step of determining a volume identity document according to the data object name, the method further comprises:

determining a prefetching processor according to the volume identity document.

14. The method according to claim 13, wherein the prefetching processor comprises a data structure that records states of all sequential read services on a specific volume.

15. The method according to claim 12, wherein after the step of determining a volume identity document according to the data object name, the method further comprises:

in response to the data object being identified for multiple times that it has a sequential read request in the object, sending the data object to a prefetching processor exclusive to the volume for processing, according to an identity document of a volume.

16. The method according to claim 1, wherein the step of determining whether the read request issued by the client is a sequential read request comprises:

determining, according to the read request issued by the client, whether the client is located in a sequential read scenario; and determining, according to a determining result, whether the read request is the sequential read request.

17. The method according to claim 1, wherein the step of in response to the read request issued by the client being the sequential read request, creating a prefetching sliding window according to a data object to be read in the read request comprises:

creating a plurality of prefetching sliding windows according to the data object to be read in the read request; and recording a position that has been read and a prefetching position that has been read of a corresponding sequential read service in each sliding window, and a queue composed of objects that need to be subsequently prefetched but have not been prefetched.

18. The method according to claim 1, wherein after the step of adding the calculated new volume object needing to be prefetched into a queue of objects to be prefetched of the prefetching sliding window and executing prefetching, the method further comprises:
deleting the volume object which has been prefetched after execution from queue of objects to be prefetched of the prefetching sliding window.

19. A computer device, comprising:
at least one processor; and
at least one memory, wherein the at least one memory stores computer-readable instructions, and the computer-readable instructions, when executed by the at least one processor, cause the at least one processor to perform following actions:
in response to an Object-based Storage Device (OSD) receiving a read request issued by a client, determining whether the read request issued by the client is a sequential read request;
in response to the read request issued by the client being the sequential read request, creating a prefetching sliding window according to a data object to be read in the read request, wherein each sliding window records position that has been read and a prefetching position that has been read of corresponding sequential read service, and a queue composed of objects that need to be subsequently prefetched but have not been prefetched;
in response receiving a new sequential read object, creating a new prefetching sliding window or updating a position that has been read of the prefetching sliding window;
in response to detecting that a time period during which the position that has been read of the prefetching sliding window has not been updated reaches a preset time period, deleting the prefetching sliding window;
in response to completion of the creation of the prefetching sliding window, calculating, according to the data object to be read in the read request, at least one new volume object needing to be prefetched; and
adding the new volume object needing to be prefetched into a queue of objects to be prefetched of the prefetching sliding window and executing prefetching.

20. A non-volatile readable storage medium, wherein the non-volatile readable storage medium stores computer-readable instructions, and the computer-readable instructions, when executed by at least one processor, cause the at least one processor to perform following actions:
in response to an Object-based Storage Device (OSD) receiving a read request issued by a client, determining whether the read request issued by the client is a sequential read request;
in response to the read request issued by the client being the sequential read request, creating a prefetching sliding window according to a data object to be read in the read request, wherein each sliding window records position that has been read and a prefetching position that has been read of corresponding sequential read service, and a queue composed of objects that need to be subsequently prefetched but have not been prefetched;
in response receiving a new sequential read object, creating a new prefetching sliding window or updating a position that has been read of the prefetching sliding window;
in response to detecting that a time period during which the position that has been read of the prefetching sliding window has not been updated reaches a preset time period, deleting the prefetching sliding window;
in response to completion of the creation of the prefetching sliding window, calculating, according to the data object to be read in the read request, at least one new volume object needing to be prefetched; and
adding the new volume object needing to be prefetched into a queue of objects to be prefetched of the prefetching sliding window and executing prefetching.

* * * * *